(No Model.)
E. K. REA.
DEVICE FOR HOLDING THE HEADS OF CATTLE.
No. 417,280. Patented Dec. 17, 1889.
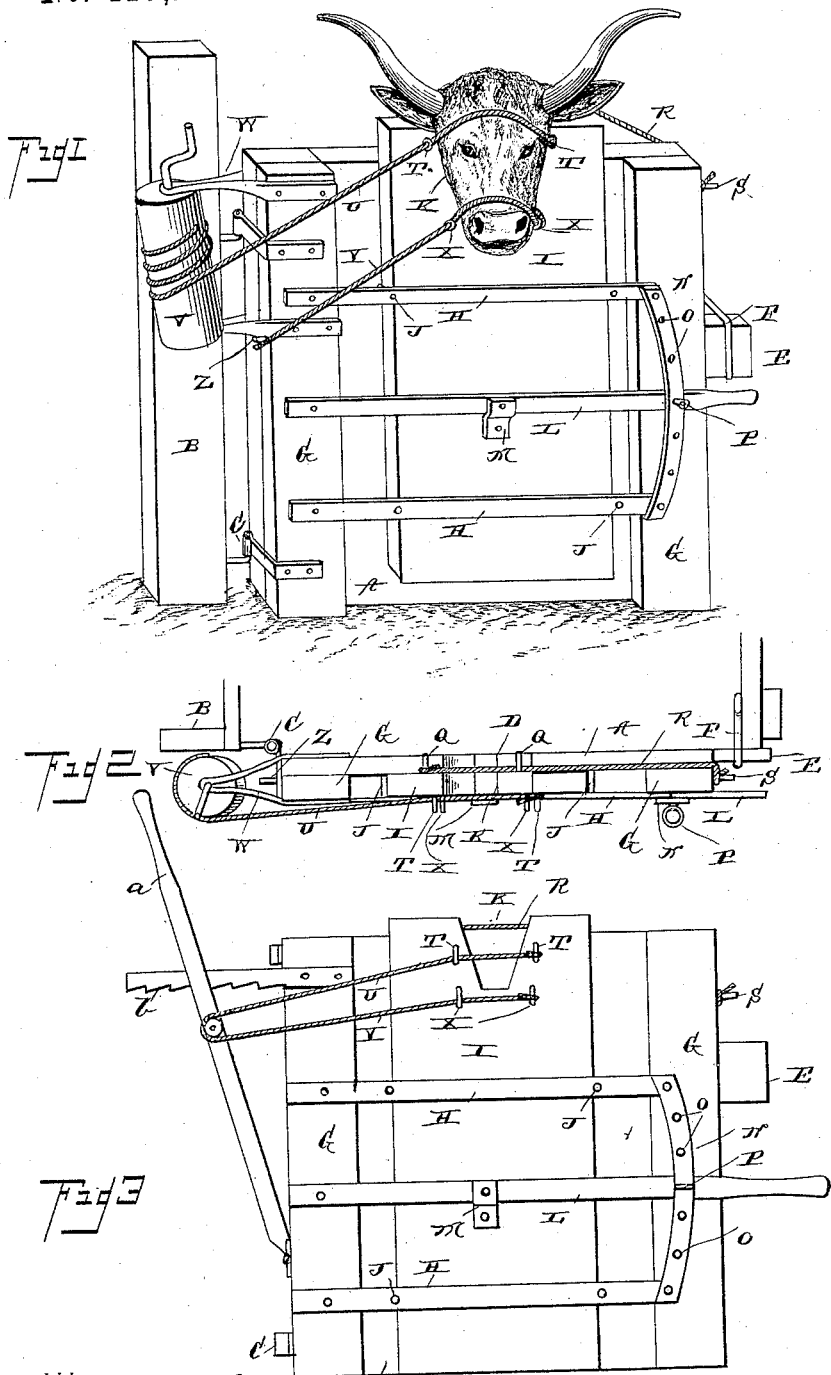

UNITED STATES PATENT OFFICE.

EDMUND K. REA, OF COWGILL, MISSOURI.

DEVICE FOR HOLDING THE HEADS OF CATTLE.

SPECIFICATION forming part of Letters Patent No. 417,280, dated December 17, 1889.

Application filed June 15, 1889. Serial No. 314,425. (No model.)

*To all whom it may concern:*

Be it known that I, EDMUND K. REA, a citizen of the United States, residing at Cowgill, in the county of Caldwell and State of Missouri, have invented a new and useful Device for Holding the Heads of Cattle, of which the following is a specification.

My invention relates to improvements in devices for holding the heads of cattle while being dehorned or while being branded; and it consists in certain novel features hereinafter described and claimed.

In the accompanying drawings, Figure 1 is a perspective view of my improved device, showing the manner of using the same. Fig. 2 is a plan view of the same, and Fig. 3 is a front view showing a slight modification.

My improved device can be applied to a pen, a stall, or to any other suitable structure; and it consists, primarily, of a vertically-disposed gate A, which is mounted on a vertical post B or on the side of the pen or stall by means of the hinges C, as clearly shown. The gate is provided in its upper edge at its center with a vertical notch D, which receives the neck of the animal, as will be readily understood on reference to Fig. 1. The gate is provided at its free edge with a projection E, which, when the gate is closed, is engaged by a hook F, pivoted to the side of the pen in any desired manner. The gate is provided on its front or outer side at its edges with the vertical end bars G, and between these end bars extend the metallic plates H, having their ends secured to the said end bars. A vertically-movable head-supporting plate I is arranged between the gate and the bars H, and is prevented from lateral movement by means of the guide-pins J, which are secured between the said bars and the gate and bear against the edges of the said plate I. This plate I is provided at its upper end with a notch K, adapted to register with the notch D in the gate, and it is raised and lowered by means of a lever L, which is pivoted at one end to one of the end bars G and extends across the gate, being connected to the plate I at an intermediate point of its length by a pin M, as clearly shown. The free end of this lever passes under a curved bar N, having a series of openings O, and it is secured at the desired point by means of a pin P, passed through one of said openings and the end of the lever into the end bar.

On the upper edge of the gate, on opposite sides of the notch D, I secure the eyes or rings Q Q, and to one of the said eyes or rings I secure a rope R, which is passed over the head of the animal in rear of the horns and then through the other ring Q to the side edge of the gate, where it is wrapped around a pin S and secured. On the front side of the plate I, and on opposite sides of the notch K therein, I secure the rings T, to one of which I secure a rope U, which is adapted to pass over the head of the animal in advance of the horns and then through the other ring T to the side of the gate, where it is wrapped around and secured to a windlass V, which is journaled in brackets W, secured to and projecting from the gate. On the front side of the plate I below the notch K, I provide the rings X X, to one of which I secure a rope Y, which is adapted to pass over the nose of the animal, then through the other ring X to the side of the gate, where it is wrapped around a pin Z and secured.

From the foregoing description, taken in connection with the accompanying drawings, it will be seen that I have provided a very simple and efficient device by which the head of the animal will be securely held and will be maintained in a natural position, and the manner of using the device is thought to be obvious. The animal is driven into the pen or stall, so that his neck will be engaged by the notches D K, and the plate I is then adjusted vertically to the height of the animal, so that the head of the animal will be supported in a natural position, after which the several ropes are arranged and secured in the described manner, so as to secure the head of the animal. The horns are then removed, the nose-ring applied, or the ear tagged, as may be desired, in the usual manner. The hook F is then released, the gate swung around, and the animal will pass out.

Instead of the windlass shown in Figs. 1 and 2 and before described, I may employ the arrangement shown in Fig. 3, in which a lever *a* is secured to the edge of the gate and projects upward alongside the same. This lever is engaged by a rack-bar *b*, secured to and projecting from the gate, so that when it has been moved outward it will be prevented from prematurely moving inward. The ropes U Y, instead of being secured in the manner before described, both pass to and are secured to the lever a, so that they will both be drawn tightly over the head of the animal to secure the same.

Having thus described my invention, what I claim, and desire to secure by Letters Patent, is—

1. The combination of a support, a vertically-disposed gate having one side hinged to the support and its other side adapted to be locked thereto and provided with a notch in its upper end, a head-supporting plate mounted on the outer side of the gate and adapted to slide vertically thereon, the said plate being provided in its upper end with a notch adapted to register with the notch in the gate, means for raising and lowering the plate, and securing-ropes on the upper ends of the gate and the plate, as set forth.

2. The combination of the horizontally-swinging gate, the head-supporting plate sliding vertically thereon, the lever pivoted at one end to the gate and extending across the plate, the link connecting the said lever with the head-supporting plate, and the securing-ropes on the gate and said plate, as set forth.

3. The combination of the gate having the vertical end bars G, the bars H, secured to and extending between said end bars, the pins J, secured between said bars H and the gate, the head-supporting plate I, moving between the gate and the bars H and guided by the pins J, mechanism for raising and lowering said plate, and the ropes secured on the gate and the said plate, as set forth.

4. The combination of the gate, the pins S Z on the edges of the same, the plate I, mounted on the gate, the windlass at one side of the gate, the rings Q Q, the rope secured to one of said rings, passing through the other, and secured around the pins S, the rings T T, the rope secured to one of said rings, passing through the other, and secured to the windlass, the rings X X, and the rope secured to one of said rings, passing through the other, and secured upon the pin Z, as set forth.

5. The gate carrying a vertically-movable plate I, both the gate and the plate being provided at their upper ends with notches to receive the neck of the animal, the rope R, adapted to pass over the back of the neck of the animal in rear of the horns, and the ropes U Y, fitted around the head and nose of the animal, and a suitable clamping or tightening device to which the ropes U and Y are both connected, as set forth.

In testimony that I claim the foregoing as my own I have hereto affixed my signature in presence of two witnesses.

EDMUND K. REA.

Witnesses:
J. W. RICE,
W. TEMPLETON.